United States Patent [19]

Luise

[11] Patent Number: 4,832,894
[45] Date of Patent: May 23, 1989

[54] PULTRUSION OF FILAMENTS OF ANISOTROPIC MELT-FORMING POLYMERS

[75] Inventor: Robert R. Luise, Boothwyn, Pa.

[73] Assignee: E. I. Du Pont de Nemours and Company, Wilmington, Del.

[21] Appl. No.: 320

[22] Filed: Jan. 5, 1987

[51] Int. Cl.$^4$ .............................................. B27B 17/00
[52] U.S. Cl. .................................... 264/130; 264/136; 264/236; 264/347; 156/180; 156/309.6
[58] Field of Search ........... 264/135, 108, 136, 211.14, 264/211.22, 211.17, 234, 130, 236, 347; 156/180, 181, 441, 309.6, 166; 65/4.4

[56] References Cited

U.S. PATENT DOCUMENTS

| | | |
|---|---|---|
| 3,388,030 | 6/1968 | Estes et al. ........................... 156/180 |
| 3,558,392 | 1/1971 | Goodenow et al. ................. 156/296 |
| 3,873,399 | 3/1975 | Goldsworthy ....................... 156/180 |
| 3,945,869 | 3/1976 | Miller et al. ......................... 156/441 |
| 4,384,016 | 5/1983 | Ide et al. ............................ 156/308.2 |
| 4,412,058 | 10/1983 | Siemionko ........................... 528/191 |
| 4,445,957 | 5/1984 | Harvey ................................ 156/441 |
| 4,469,541 | 9/1984 | Goldsworthy ....................... 156/180 |
| 4,540,737 | 9/1985 | Wissbrun et al. .................... 524/599 |
| 4,547,244 | 10/1985 | Ito et al. .............................. 156/180 |

Primary Examiner—Richard V. Fisher
Assistant Examiner—Coreen Y. Lee

[57] ABSTRACT

Articles from filaments of thermotropic liquid crystal polymers are formed by pultrusion without use of extraneous binder, wherein the filaments formed in a bundle are essentially parallel to permit the greatest surface contact between adjacent filaments.

2 Claims, No Drawings

PULTRUSION OF FILAMENTS OF ANISOTROPIC MELT-FORMING POLYMERS

BACKGROUND OF THE INVENTION

The present invention is directed to improved pultruded articles.

It has long been known to produce composite reinforced articles such as prepreg tapes and rovings by various pultrusion methods. See, for example, U.S. Pat. No. 4,540,737. While such methods are generally capable of producing acceptable products, it is desirable in certain instances to employ a matrix material which enhances the ability of the product to be employed in certain environments where thermal and chemical stability are important. High degrees of orientation of the polymer matrix are also sometimes desirable to optimize the mechanical properties of the product.

As pointed out in the aforementioned U.S. Pat. No. 4,540,737, it is also necessary that articles produced by pultrusion satisfy the following basic requirements during processing: (1) that the reinforcing fibers be uniformly distributed throughout the polymer matrix material; (2) that the bundles of the reinforcing fibers which are employed should be well impregnated with the matrix polymer; and (3) that the fibers should be sufficiently bonded to the matrix polymer.

SUMMARY OF THE INVENTION

In accordance with the present invention, there is provided a method for the production of a pultruded article from filaments of anisotropic melt-forming polymer without the addition of polymer matrix material. Also comprehended is the resultant pultruded article.

DETAILED DESCRIPTION OF THE INVENTION

It has been surprisingly and unexpectedly discovered that filaments of thermotropic liquid crystalline polymers (as defined) are particularly suitable for use in the production of articles, such as rods or tapes, by a pultrusion process wherein the article avoids the use of matrix materials or "glue".

Thermotropic liquid crystal polymers are polymers which are anisotropic in the melt phase. These polymers have been described by various terms, including "liquid crystalline", "liquid crystal", "mesophase" and "anisotropic melt-forming". Such properties may be confirmed by conventional polarized light techniques whereby crossed polarizers are utilized. The polymer is optically anisotropic if, in the melt phase, it transmits light when examined between crossed polarizers.

Thermotropic liquid crystal polymers include but are not limited to wholly and non-wholly aromatic polyesters, aromatic-aliphatic polyesters, aromatic polyazomethines, aromatic polyester-carbonates and aromatic and non-wholly aromatic polyester-amides. Various such polymers are described in said U.S. Pat. No. 4,540,737. The filaments useful for this invention are made from such polymers.

In accordance with the present invention, a bundle of as-spun liquid crystal polymer filaments, while heated, are pulled through a die to shape the bundle into the pultruded article. In the course of being pulled through the die, the surfaces of the filaments in the bundle, softened by application of heat, adhere to each other under the pressure applied in squeezing through the die which shapes the pultruded article. The temperature to be applied should be sufficient to soften the surfaces of the filaments to promote adhesion between filaments. Excessively high temperatures should be avoided since they will only weaken the filaments to the extent that they cannot be pulled through the die. The temperatures to be employed will depend on the softening point of the particular polymeric fiber and the stress to be put on the filament bundle as it is pulled through the die. Temperatures in the range of 200° C. to 300° C. are often useful. Conveniently, the filament bundle is heated by contact with the hot die.

The relationship of bundle size to die opening that is necessary is readily determined by those skilled in the art. Pultruded articles of from 15 to 200 mils in the greatest cross-sectional dimension are contemplated. It is important that the filaments in the bundle be essentially parallel to permit the greatest surface contact between adjacent filaments and hence the best bonding. The self-bonded pultruded product may be in the form of a rod or tape of various cross-sectional shapes depending on the shape of the die. To prevent sticking of filaments to the die, the fibers are coated with a conventional internal mold release agent prior to pultrusion.

After pultrusion, the article is heat-treated to greatly enhance the strength of the article. Heat strengthening of filaments of liquid crystal polymers is well known in the art (see U.S. Pat. No. 4,183,895). In general, heat strengthening is achieved by heating the article in a purged inert atmosphere such as, for example, nitrogen, argon, or under vacuum, at a temperature close to but below the melting point for a period sufficient to increase tensile strength. Temperatures of between 200° C. to 350° C. and heating periods of from 30 minutes to 48 hours are useful.

The advantages of the present self-bonded (the fibers are bonded directly to each other) pultruded articles will be obvious. Since there is no extraneous binder or foreign matrix material required, there is no concern about bonding between fiber and matrix, about uniform distribution of fiber throughout the matrix or about differences between the fiber and matrix which will interfere with intended end-use applications.

The following example is illustrative of this invention and is not intended as limiting.

EXAMPLE 1

This example illustrates the continuous preparation of a high strength, highly oriented uniaxial rod from a liquid crystal copolyester. The polymer is prepared by methods described in U.S. Pat. No. 4,412,058 from chlorohydroquinone, 4,4'-dihydroxydiphenyl isophthalic and terephthalic acids in the mol proportions of 40/10//40/10. A yarn of 2360 denier/360 filaments is spun from the polymer. Yarn taken from bobbins produced in this spin exhibited a tenacity of about 6 grams per denier, an elongation of about 1.7 and a modulus of about 350 grams per denier.

The yarn is coated with a 1% wt. solution of a mold release agent (KantStik Specialty Products Co.) in methylene chloride. The coated yarn is plied 7 times and the 16,520 denier tow is pulled at 6.5 in/min through a heated stainless steel die (hypodermic tubing) of 12 in length and 63 ml internal diameter enclosed in a heated tube. The tube is divided into two separately heated zones. The entrance zone of 4.7 in length is heated at 277° C., while the exit zone of 6.3 in length is heated at 283° C. The pultruded product consists of a solid continuous rod of 52 mil diameter.

The rod is cut into 2 ft. sections, which are placed on a woven fiberglass mat in a nitrogen-purged oven and heated stage-wise from room temperature to 280° C. in 2 hr, held at 280° C. for 2 hr, then heated to 305° C. in 0.5 hr, held at 305° C. for 2 hr, then heated to 335° C. in 0.5 hr, and held at 335° C. for 12 hr, whereupon the oven is cooled to room temperature and the heat-treated sections removed.

The tensile properties of the heat-treated rod are determined using a standard Instron tensile testing machine. At a test or gage length of 4 in, a maximum tensile stress of 141.8 kpsi and tensile modulus of 6090 kpsi are measured. A standard Instron flexural testing machine is also used to measure a short beam shear strength of 5.9 kpsi at 4/1 span/diameter.

I claim:

1. A method for preparing a shaped pultruded article comprising pulling a bundle of as-spun liquid crystal polymer filaments through a hot die to soften the surfaces of the filaments and without addition of polymer matrix material, wherein the filaments in the bundle are essentially parallel to permit the greatest surface contact between adjacent filaments and causing the filaments to adhere to each other by the pressure exerted against the filament bundle in passing through the die.

2. A method according to claim 1 wherein the pultruded article is heat strengthened.

* * * * *